March 16, 1948. K. G. JANSKY 2,437,695
THREE-DIMENSION RADIO DIRECTION FINDER
Filed Aug. 30, 1943

INVENTOR
K.G. JANSKY
BY A. J. Zerbarini
ATTORNEY

Patented Mar. 16, 1948

2,437,695

UNITED STATES PATENT OFFICE 2,437,695

THREE-DIMENSION RADIO DIRECTION FINDER

Karl G. Jansky, Little Silver, N. J., assignor to Bell Telephone Laboratories, Incorporated, New York, N. Y., a corporation of New York Application August 30, 1943, Serial No. 500,541

8 Claims. (Cl. 250—11)

This invention relates to radio direction finders and particularly to absolute or three-dimension direction finders.

As is known the azimuthal direction of arrival of a radio wave may be determined by a "phase-comparison" direction finder as, for example, the system disclosed in the copending application of H. T. Budenbom, Serial No. 741,372, filed August 23, 1934, now Patent No. 2,423,437 issued July 8, 1947 or by an "amplitude-comparison" direction finder as, for example, the system disclosed in the copending joint application of applicant and C. F. Edwards, Serial No. 431,194, filed February 17, 1942, now Patent No. 2,419,946 issued May 6, 1947. Also, as shown by Patent 2,003,933 to J. W. Greig and British Patent 504,293 to H. G. Thomas, so-called three-dimension systems for determining the actual or absolute wave direction, that is, the wave direction in both the vertical and horizontal planes, have been suggested. In general, the prior art absolute or three-dimension systems are based on the amplitude-comparison principle and are in effect a combination of two distinct direction finders, one for the horizontal plane and the other for the vertical plane. Moreover, most of the three-dimension systems heretofore proposed comprise complicated structures such as a rotating antenna or antenna arrays associated with separate indicators; and these complicated arrangements are not entirely satisfactory. In accordance with the present invention a simple antenna system and a single indicator are employed, and the phase-comparison principle is utilized, for determining the horizontal and vertical plane directions of an incoming wave.

It is one object of this invention to ascertain the absolute direction in space of a radio wave.

It is another object of this invention to determine the directions, in perpendicular planes, of an incoming radio wave.

It is still another object of this invention to secure simultaneous indications of the vertical and horizontal plane directions of a radio wave on an indicator associated with a simple antenna system.

In accordance with one embodiment of the invention, a vertical antenna element is positioned at each corner of a square or a right angle isosceles triangle, the elements being hereafter referred to as W (west), E (east), and S (south). The three elements constitute two perpendicularly related linear arrays of two elements each, one element being common to both arrays and the spacings between the common element and the remaining two elements being the same. Separate receivers are connected by lines of equal length to the three elements. Considering each array and the corresponding receivers, a phase meter comprising a phase indicator and an adjustable phase shifter is connected to the outputs of the two receivers and an adjustable potentiometer associated with a source of direct current is connected or ganged to the phase shifter so that, upon adjustment of the phase shifter, the potentiometer setting is altered to agree with that of the phase shifter. The two potentiometer voltages are applied to different pairs of plates of a cathode tube indicator, and a so-called spot trace or indication is obtained.

In operation, the phase shifters are adjusted to secure a zero indicator reading whereby, for each array, a direct current potentiometer voltage is obtained which is representative of the phase relation of the two antenna currents. Each of the two voltages thus obtained is a function of the vertical angle of wave arrival; and the amount of displacement or deflection of the cathode tube spot indication from its center position is a measure of the vertical arrival angle. Also, one voltage is a cosine function and the other voltage is a sine function of the angle in a horizontal plane between the wave direction and the axis of one array. The angle between the radial path extending from the spot traced to the center position of the spot and a reference line on the tube screen representing the reference array axis is a measure of the azimuthal arrival angle.

The invention will be more fully understood from a perusal of the following specification taken in conjunction with the drawing on which like reference characters denote elements of similar function and on which:

Figure 1:
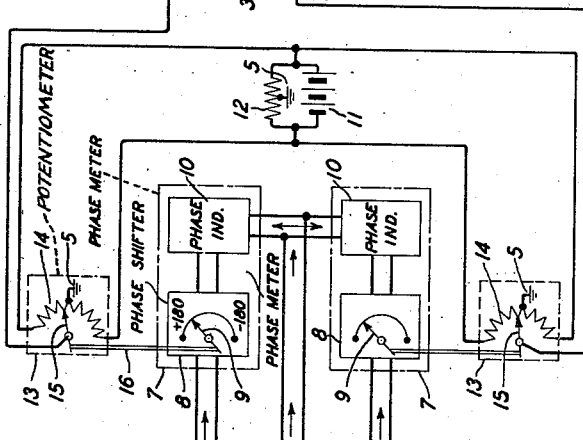
Fig. 1 is a schematic illustration of one embodiment of the invention.
Figure 1:
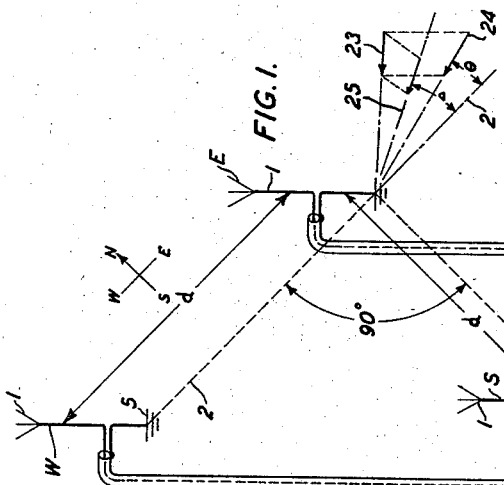

Referring to Fig. 1, numerals 1 denote vertical metallic antenna elements positioned at the corners of the right angle isosceles triangle and designated W, E and S. The W and S antenna elements are equally spaced a distance $d$ from the E or central antenna and as explained fully hereinafter the E antenna may be considered as the reference antenna. Also antennas E and S constitute one array and antennas E and W constitute another array, and axis 2 of array E-W being a directional reference line. The antenna elements 1 are connected to similarly designated individual receivers 3 by coaxial lines 4 having equal lengths. The outer conductors are connected to ground 5. If the three paths from the antenna 1 to the receivers 3 are unequal, the loops 6 may be included in the shortest and intermediate lines for the purpose of securing equal line lengths.

Numerals 7 denote phase meters each comprising an adjustable phase shifter 8 having a movable arm 9, and a phase indicator 10, one meter being included between the receivers E and W and the other meter being connected between the receivers E and S. Numeral 11 denotes a battery and numeral 12 designates a resistance connected in shunt to the battery and having its mid-point connected to the ground 5. Numerals 13 designate adjustable potentiometers connected in shunt to battery 11, each potentiometer 13 comprising a resistive winding 14 and a movable contact arm 15. As shown by the rod or connection 16 the movable arms 9 and 15 of one phase shifter 8 and one potentiometer 13 are connected together for unicontrol operation; and the movable arms 9 and 15 of the other phase shifter 8 and the other potentiometer 13 are similarly ganged. Numeral 17 denotes a cathode ray tube indicator having two horizontal plates 18 and 19 for vertically reflecting the tube beam and two vertical plates 20 and 21 for horizontally deflecting the beam. Plate 18 is connected by conductor 22 to the movable arm 15 of the potentiometer 13 associated with the array E-S and plate 20 is connected to the movable arm 15 of the potentiometer associated with the array E-W. The plates 19 and 21 and the mid-points of the potentiometer windings 14 are connected to the ground 5.

In operation, Fig. 1, separate components of an incoming wave 23 making an angle $\Theta$ in the horizontal plane with the reference axis 2 of array E-W and an angle $\Delta$ in the vertical plane with a horizontal or azimuthal plane, are absorbed by antenna elements 1 and conveyed over lines 4 to the receivers 3. Numerals 24 and 25 denote, respectively, the horizontal and vertical plane directions of the incoming wave 23. See Figs. 2 and 3. Considering each of the arrays E-W and E-S, detected voltages are obtained in the outputs of the two associated receivers and their phase relation as shown by indicator 10, corresponds to the phase relation of the two absorbed components. The phase difference, if any, is eliminated or compensated by adjusting the arm 9 of phase shifter 8 to secure a zero reading on indicator 10. Since the potentiometer contact arm 15 and the phase shifter contact arm 9 are unicontrolled, a direct current potentiometer voltage having a polarity and an amplitude representative of the phase difference is obtained and this potential is applied to plate 18 or 20 of tube 17. In other words, the direct current potential impressed across plates 18 and 19 represents the phase relation of the currents absorbed by antenna elements S and E; and the potential impressed across plates 20 and 21 represents the phase relation of the components collected by elements W and E, the phase of the components intercepted by element E being considered the reference phase.

The two potentials on the quadrature plates of tube 17 cause a deflection or displacement from the center position of the cathode beam and produce a spot trace 26. Numeral 27 denotes the radial displacement and the reference character $\alpha$ denotes the angle between this radius and the reference line 28, corresponding to the axis 2 of the E-W antenna array. As will now be explained, the radius or length 27 is directly proportional to the vertical plane wave arrival angle $\Delta$ and the angle $\alpha$ is equal to the horizontal plane wave arrival angle $\Theta$, so that indications of both the vertical and horizontal plane wave arrival directions are simultaneously obtained on the single indicator 17. Preferably the screen of the cathode ray tube 17 contains calibrated markings such as the radial angle lines 30 and the concentric circles 31 for easily evaluating the two indications obtained.

Figure 2:
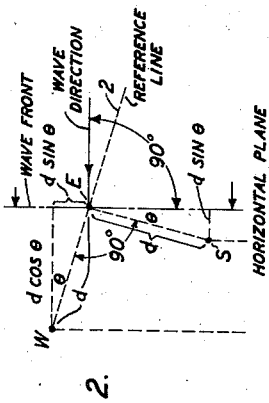
Figs. 2 and 3 are respectively horizontal and vertical plane diagrams used in explaining the operation of the system of Fig. 1.
Figure 3:
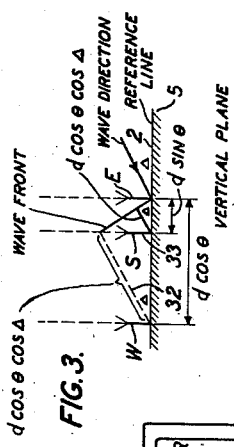
Figure 4:
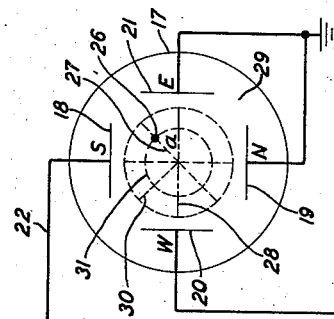
Fig. 4 is a plan view of an antenna system comprising the receiving antenna system of Fig. 1 and in addition a local transmitting antenna.
Figure 4:
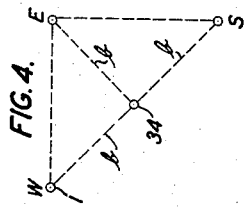

Referring to Figs. 2 and 3 the phase difference, $\Phi_{E-W}$, of the potentials established in the antenna elements E and W is given by the following equation:

$$\Phi_{E-W} = \frac{2\pi d \cos \Theta \cos \Delta}{\lambda} \quad (1)$$

where $\pi = 3.14$ and is a constant,
$d =$ spacing between elements E and W and between elements E and S, and is a constant,
$\lambda =$ operating wavelength and is a constant.

Similarly, the phase difference, $\Phi_{E\cdot S}$, between the potentials established in elements E and S is:

$$\Phi_{E-S} = \frac{2\pi d \sin \Theta \cos \Delta}{\lambda} \quad (2)$$

In Fig. 3, $\Phi_{E-W}$ and $\Phi_{E\cdot S}$ are represented, respectively, by lines 32 and 33, the constant $$\frac{2\pi}{\lambda}$$

being disregarded. Hence the direct current potential, $P_{E-W}$, obtained at the potentiometer 13 associated with the E and W elements may be expressed $$P_{E-W} = \frac{k 2\pi d \cos \Theta \cos \Delta}{\lambda} \quad (3)$$

where $k$ is a constant.

Similarly, for the E and S elements the potentiometer voltage $P_{E\cdot S}$ is:

$$P_{E-S} = \frac{k 2\pi d \sin \Theta \cos \Delta}{\lambda} \quad (4)$$

For any given value of $\Delta$ and $\Theta$ the values of $P_{E-W}$ and $P_{E\cdot S}$, as given by Equations (3) and (4), represent respectively the $x$ and $y$ coordinates for a point or spot 26 on a circle, the radius of the circle having a length $$\frac{k 2\pi d}{\lambda} \cos \Delta$$

derived as follows:

$$\text{radius} = \sqrt{x^2 + y^2} = \sqrt{P^2_{E-W} + P^2_{E-S}}$$
$$= \sqrt{\frac{k^2 4\pi^2 d^2}{\lambda^2} \cos^2 \Delta (\cos^2 \Theta + \sin^2 \Theta)} \quad (5)$$
$$= \frac{k 2\pi d}{\lambda} \cos \Delta$$

Thus, since the radius is a function of the wavelength, $\lambda$, and the antenna spacing, $d$, in order to determine the vertical angle of arrival, the equipment must be calibrated for each wavelength on which measurements are to be made.

Now $$\tan \alpha = \frac{P_{E-S}}{P_{E-W}}$$

$$= \frac{\frac{k2\pi d \sin \Theta \cos \Delta}{\lambda}}{\frac{k2\pi d \cos \Theta \cos \Delta}{\lambda}} \quad (6)$$

$$= \frac{\sin \Theta}{\cos \Theta} = \tan \Theta$$

Hence $$\alpha = \Theta \quad (7)$$

Thus, the radius or distance 27 is a measure of the vertical wave arrival angle Δ and the angle α is equal to the horizontal wave arrival angle Θ.

Although the invention has been explained in connection with specific embodiments, it is to be understood that it is not to be limited to the apparatus described inasmuch as other apparatus may be successfully employed in practicing the invention.

What is claimed is:

1. A method of determining the absolute direction in space of a radio wave which comprises simultaneously receiving three electric components of said wave, simultaneously obtaining a voltage representing the phase relation of one pair of components and another voltage representing the phase relation of another pair of components, and obtaining from said voltages two simultaneous indications representing the wave arrival angles in two perpendicularly related planes.

2. A method of determining the absolute direction of an incoming wave, utilizing a cathode tube indicator having two pair of quadrature plates, which comprises simultaneously receiving at three spaced locations in the azimuthal plane electric components of said wave, the phase relation of one pair and the phase relation of a different pair of the three received components being proportional to different functions of the horizontal plane wave arrival angle and proportional to the same function of the vertical plane wave arrival angle, simultaneously obtaining a pair of voltages each representing a different one of said phase relations, and simultaneously applying said voltages each to a different pair of said plates.

3. A method of determining the vertical and horizontal plane arrival angles of a radio wave, utilizing three receiving antennas positioned in a horizontal plane at the corners of a right angle isosceles triangle and constituting two arrays of two elements each, and a cathode ray tube indicator having two pairs of deflecting plates positioned quadrature, which comprises simultaneously receiving three similarly polarized electric components of said wave, simultaneously obtaining a pair of direct current voltages representing the phase relations of the components received by each array and applying each voltage to a different pair of said plates.

4. A three-dimension direction finding system comprising means for simultaneously receiving at least three distinct electric components of an incoming wave, means for obtaining a pair of voltages, one representing the phase relation of one pair and the other representing the phase relation of another pair of said components, and means for simultaneously obtaining from said voltages an indication of the arrival angle of said wave in a given plane and an indication of the wave arrival angle in a plane perpendicular to the first-mentioned plane.

5. A three-dimension direction finding system comprising means for simultaneously receiving at least three distinct electric components of an incoming wave, means for ascertaining the phase relation of one pair of said components and the phase relation of another pair of said components, means controlled by the last-mentioned means for obtaining a pair of voltages, one representing the phase relation of one pair and the other representing the phase relation of another pair of said components, and means for simultaneously obtaining from said voltages indications of the wave arrival angles in perpendicularly related planes of propagation.

6. In combination, three vertical linear receiving antennas positioned at three corners of a square, means for simultaneously obtaining two voltages, one voltage representing the phase relation of the wave components received by one pair of closely positioned antennas and the other representing the phase relation of the components received by the other pair of closely positioned antennas, a cathode ray tube indicator having quadrature plates, and means for simultaneously applying each voltage to a different pair of plates.

7. In combination, three vertical linear receiving antennas positioned at three corners of a right angle isosceles triangle and constituting two perpendicularly related arrays, separate receivers simultaneously connected to said elements, a cathode ray tube having two pairs of quadrature plates, means for ascertaining the phase relations of the two wave components received by the antennas in each array, said means comprising separate phase meters connected between the two receivers for each array, means for obtaining potentials corresponding to the two ascertained phase relations and impressing each potential on a different pair of said plates.

8. A combination in accordance with the preceding claim, each phase meter comprising a phase shifter and a phase indicator.

KARL G. JANSKY.

REFERENCES CITED

The following references are of record in the file of this patent:

UNITED STATES PATENTS

| Number | Name | Date |
|---|---|---|
| 2,208,378 | Luck | July 16, 1940 |
| 2,282,630 | Busignies | May 5, 1942 |
| 2,284,475 | Plebanski | May 26, 1942 |